US011491959B2

United States Patent
Horiguchi et al.

(10) Patent No.: US 11,491,959 B2
(45) Date of Patent: Nov. 8, 2022

(54) BRAKING CONTROL DEVICE (71) Applicant: SUBARU CORPORATION, Tokyo (JP)

(72) Inventors: Harunobu Horiguchi, Tokyo (JP); Ryoichi Mizutani, Tokyo (JP); Akihisa Osada, Tokyo (JP); Yohei Kawashima, Tokyo (JP); Yuki Sugimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 264 days.

(21) Appl. No.: 17/060,406

(22) Filed: Oct. 1, 2020

(65) Prior Publication Data
US 2021/0213919 A1 Jul. 15, 2021

(30) Foreign Application Priority Data

Jan. 14, 2020 (JP) .............................. JP2020-003411

(51) Int. Cl.
*B60T 8/171* (2006.01)
*B60T 8/174* (2006.01)
*B60T 7/12* (2006.01)
*B60T 8/58* (2006.01)
*B60T 8/32* (2006.01)

(52) U.S. Cl.
CPC ................ *B60T 8/174* (2013.01); *B60T 7/12* (2013.01); *B60T 8/171* (2013.01); *B60T 8/321* (2013.01); *B60T 8/58* (2013.01); *B60T 2210/124* (2013.01)

(58) Field of Classification Search
CPC . B60T 8/174; B60T 7/12; B60T 8/171; B60T 8/321; B60T 8/58; B60T 2210/124; B60T 8/172; B60W 30/18109; B60W 40/068; B60W 60/001
USPC .......................................................... 701/70
See application file for complete search history.

(56) References Cited

U.S. PATENT DOCUMENTS

| 3,685,619 A | * | 8/1972 | Koivunen | .................. B60T 8/74 |
| | | | | 188/181 A |
| 3,807,811 A | * | 4/1974 | Nakamura | ........... B60T 8/17613 |
| | | | | 188/181 C |
| 5,413,405 A | * | 5/1995 | Okazaki | .............. B60T 8/17636 |
| | | | | 188/181 C |

(Continued)

FOREIGN PATENT DOCUMENTS

JP 2013-020293 A 1/2013

*Primary Examiner* — Shardul D Patel
(74) *Attorney, Agent, or Firm* — McDermott Will & Emery LLP (57) ABSTRACT A braking control device includes a target vehicle speed setting unit, a braking power control unit, and a low friction coefficient region recognition unit. The low friction coefficient region recognition unit recognizes a low friction coefficient region of a road surface between a current position of an own vehicle and a target position. The braking power control unit estimates a maximum deceleration rate assuming braking to be started after passage through the low friction coefficient region to cause deceleration to a target vehicle speed at the target position. On the condition that the maximum deceleration rate is smaller than a predetermined upper limit on a deceleration rate, the braking power control unit causes a start of generation of braking power after the passage through the low friction coefficient region.

12 Claims, 6 Drawing Sheets

(56) References Cited

U.S. PATENT DOCUMENTS

| | | | |
|---|---|---|---|
| 6,719,076 B1 * | 4/2004 | Tabata | B60L 50/61 903/910 |
| 11,285,935 B2 * | 3/2022 | Adachi | B60W 30/18154 |
| 2003/0062770 A1 * | 4/2003 | Sasaki | B60T 13/662 303/152 |
| 2011/0178689 A1 * | 7/2011 | Yasui | B60W 40/076 701/70 |
| 2015/0274018 A1 * | 10/2015 | Crombez | B60L 7/18 701/22 |
| 2019/0031174 A1 * | 1/2019 | Adachi | B60W 30/181 |

* cited by examiner

BRAKING CONTROL DEVICE

CROSS-REFERENCE TO RELATED APPLICATIONS

This application claims priority from Japanese Patent Application No. 2020-003411 filed on Jan. 14, 2020, the entire contents of which are hereby incorporated by reference.

BACKGROUND

The disclosure relates to a braking control device that controls a braking device, or a brake device, of a vehicle such as an automobile.

Vehicles such as automobiles include brake devices. Brake devices make an ABS (Antilock Braking System) control. The ABS control includes preventing wheels locking. Wheels locking is caused by excessive braking power with respect to friction force generated between tires and a road surface. With wheels locking, vehicle steering does not work, causing lowered operation stability such as occurrence of a side slip.

In the ABS control, a revolution speed of each of the wheels is monitored. In a case of detection of wheels locking or a symptom of wheels locking, braking power of relevant ones of the wheels are periodically increased and decreased, to restore revolutions of the wheels.

For example, Japanese Unexamined Patent Application Publication (JP-A) No. 2013-20293 describes one of existing techniques to reduce side slips on vehicle travel and provide vehicle operation stability. In JP-A No. 2013-20293, during passage over a metal structure on a road surface on accelerated travel or on turning travel, an engine torque control, a throttle valve control, and a brake control are carried out to control an acceleration rate of an own vehicle and to prevent a slip or a spin.

SUMMARY

An aspect of the technology provides a braking control device including a target vehicle speed setting unit, a braking power control unit, and a low friction coefficient region recognition unit. The target vehicle speed setting unit is configured to set a target position ahead of an own vehicle, and set a target vehicle speed at arrival of the own vehicle at the target position. The braking power control unit is configured to make a braking power control of a braking device, to bring a vehicle speed of the own vehicle to the target vehicle speed at the arrival of the own vehicle at the target position. The low friction coefficient region recognition unit is configured to recognize a low friction coefficient region of a road surface between a current position of the own vehicle and the target position. The low friction coefficient region has a friction coefficient locally lower than a friction coefficient of a surrounding region of the road surface. The braking power control unit is configured to estimate a maximum deceleration rate assuming braking to be started after passage through the low friction coefficient region to cause deceleration to the target vehicle speed at the target position. On the condition that the maximum deceleration rate is smaller than a predetermined upper limit on a deceleration rate, the braking power control unit is configured to cause a start of generation of braking power after the passage through the low friction coefficient region.

An aspect of the technology provides a braking control device including a target vehicle speed setting unit, a braking power control unit, and a low friction coefficient region recognition unit. The target vehicle speed setting unit is configured to set a target position ahead of an own vehicle, and set a target vehicle speed at arrival of the own vehicle at the target position. The braking power control unit is configured to make a braking power control of a braking device, to bring a vehicle speed of the own vehicle to the target vehicle speed at the arrival of the own vehicle at the target position. The low friction coefficient region recognition unit is configured to recognize a low friction coefficient region of a road surface. The low friction coefficient region is expected to be passed through by the own vehicle during the braking power control, and has a friction coefficient locally lower than a friction coefficient of a surrounding region of the road surface. On the condition that the low friction coefficient region recognition unit recognizes the low friction coefficient region, the braking power control unit is configured to change a position of a start of generation of braking power, in front of the low friction coefficient region, in a direction more away from the target position than without the low friction coefficient region recognized, and reduce a maximum deceleration rate during deceleration, to a smaller value than without the low friction coefficient region recognized.

An aspect of the technology provides a braking control device including a target vehicle speed setting unit, a braking power control unit, and a low friction coefficient region recognition unit. The target vehicle speed setting unit is configured to set a target position ahead of an own vehicle, and set a target vehicle speed at arrival of the own vehicle at the target position. The braking power control unit is configured to make a braking power control of a braking device, to bring a vehicle speed of the own vehicle to the target vehicle speed at the arrival of the own vehicle at the target position. The low friction coefficient region recognition unit is configured to recognize a low friction coefficient region of a road surface. The low friction coefficient region is expected to be passed through by the own vehicle during the braking power control, and has a friction coefficient locally lower than a friction coefficient of a surrounding region of the road surface. On the condition that the low friction coefficient region recognition unit recognizes the low friction coefficient region, the braking power control unit is configured to reduce a deceleration rate before passage through the low friction coefficient region, and raise the deceleration rate after the passage through the low friction coefficient region.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

An ABS (Antilock Braking System) control may sometimes make an instantaneous intervention in a case with presence of a low friction coefficient region, or a low-μ region, in a portion of a road surface, even on normal travel that does not involve, for example, abrupt braking. Non-limiting examples of the low-μ region may include a wet metal structure such as a manhole, and an ice patch.

For example, on travel by an automated driving control, in a case with automatic braking in front of a target object such as a stop line, passing over a wet metal structure causes an instantaneous intervention by the ABS control. This results in a longer distance before making a stop.

Moreover, such an instantaneous intervention by the ABS control causes an abrupt increase and decrease in a deceleration rate of a vehicle body, and/or operation noises or vibration of equipment by the ABS control, giving occupants the feeling of uncomfortableness or anxiety.

It is desirable to provide a braking control device that makes it possible to decelerate appropriately even in a case with a locally reduced friction coefficient of a road surface, while preventing an intervention by the ABS control.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

A braking control device according to an embodiment of the technology may be provided as part of an automated driving control apparatus of an automobile such as a passenger car. The automobile may include, for example, an engine-electric hybrid power train.

Figure 1:
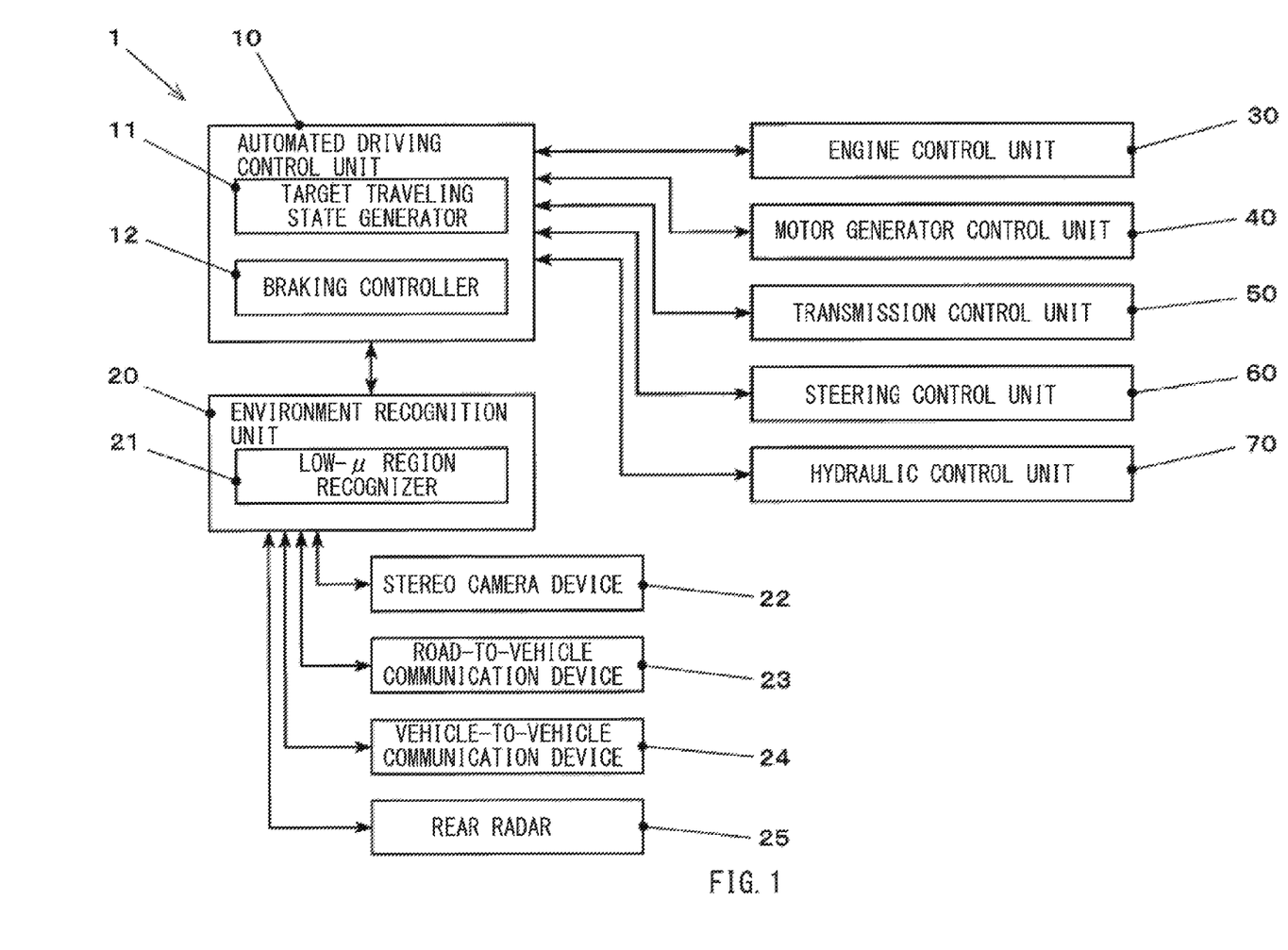
FIG. 1 is a block diagram schematically illustrating a configuration of a braking control device according to an embodiment of the disclosure.

FIG. 1 is a block diagram schematically illustrating a configuration of the braking control device according to the embodiment.

An automated driving control apparatus 1 including the braking control device may include, for example, an automated driving control unit 10, an environment recognition unit 20, an engine control unit 30, a motor generator control unit 40, a transmission control unit 50, a steering control unit 60, and a hydraulic control unit 70.

Each unit may include, for example, an information processor such as a CPU (Central Processing Unit), a storage such as an RAM (Random Accessible Memory) and a ROM (Read Only Memory), an input and output interface, and a bus that couples them together. The units may be coupled together directly or through an on-vehicle LAN (Local Area Network) such as a CAN (Control Area Network) communication system, to communicate with one another.

The automated driving control unit 10 may give instructions to each unit on the basis of a result of recognition of environment around an own vehicle by the environment recognition unit 20, to allow the vehicle to travel automatically.

The automated driving control unit 10 may include, for example, a target traveling state generator 11 and a braking controller 12.

The target traveling state generator 11 may generate an automated driving scenario, i.e., scheduled transitions of target traveling states, on the basis of the result of the recognition by the environment recognition unit 20. The automated driving scenario may include information regarding, for example, vehicle states of the own vehicle. Non-limiting examples of the vehicle states may include a target travel locus of the own vehicle, and a target vehicle speed at each point on the target travel locus.

The automated driving control unit 10 may give the instructions to each unit and allow each unit to perform driving operations of the vehicle, to allow the vehicle to travel, following faithfully the automated driving scenario generated by the target traveling state generator 11.

In one embodiment of the technology, the target traveling state generator 11 may serve as a "target vehicle speed setting unit".

The braking controller 12 may make a sequential control of, for example, presence or absence of generation of braking power of the vehicle, and magnitude of braking power in a case where braking power is to be generated.

In the embodiment, the vehicle may make a cooperative control of a service braking system and a regenerative brake, to control the motor generator control unit 40 and the hydraulic control unit 70 to match an actual deceleration rate of the vehicle with a target deceleration rate set by the braking controller 12. The service braking system may include a hydraulic disc brake. The regenerative brake utilizes regenerative power generation by a motor generator.

The environment recognition unit 20 may recognize the environment around the own vehicle with the use of, for example, sensors installed in the own vehicle, road-to-vehicle communication, and vehicle-to-vehicle communication.

The environment recognition unit 20 may include a low-μ region recognizer 21, or a low friction coefficient region recognizer 21.

The low-μ region recognizer 21 may recognize presence or absence of a low-μ region of a road surface on the target travel locus of the own vehicle, on the basis of information regarding the recognized environment around the own vehicle. The low-μ region has a friction coefficient locally lower than a friction coefficient of a surrounding region of the road surface. In a case with the presence of any low-μ region recognized, the low-μ region recognizer 21 may obtain a relative position of the low-μ region to the own vehicle and an estimated friction coefficient of the low-μ region.

For example, the low-μ region recognizer 21 may recognize, as the low-μ region, a region having a friction coefficient low enough for braking power in a normal braking control to cause an intervention by the ABS control. The normal braking control refers to a braking control in a normal automated driving control.

The presence of the low-μ region may be determined by, for example, image processing of an image captured by an imaging device such as a stereo camera device 22.

Alternatively, the low-μ region may be recognized on the basis of information obtained by the road-to-vehicle communication, i.e., communication with a ground station owned by, for example, a road administrator.

In another alternative, the low-μ region may be recognized on the basis of information obtained by the vehicle-to-vehicle communication, i.e., communication with a surrounding vehicle that passed the low-μ region before the own vehicle.

As an estimation technique of the friction coefficient μ, for example, in a case where attributes of the low-μ region are recognized by, for example, the image processing, a prescribed value with respect to each of the attributes may be given as an estimated μ. Non-limiting examples of the attributes may include a wet metal structure, an ice patch, and piled snow.

Alternatively, in a case where tire slip states are acquirable, by the vehicle-to-vehicle communication, from surrounding vehicles that passed through the low-μ region, the estimated μ may be obtained on the basis of information thus acquired. Non-limiting examples of the tire slip states may include operation states of the ABS control, a traction control, and a behavior control device.

To the environment recognition unit 20, coupled may be the stereo camera device 22, a road-to-vehicle communication device 23, a vehicle-to-vehicle communication device 24, and rear radar 25.

The stereo camera device 22 may include a pair of cameras and an image processor. The pair of the cameras may be disposed in spaced relation away from each other in a vehicle widthwise direction, with their imaging ranges directed frontward of the vehicle. The image processor may perform known stereo image processing on images captured by each of the pair of the cameras.

The stereo camera device 22 is configured to recognize the low-μ region by the image processing and calculate the relative position of the low-μ region to the own vehicle.

The road-to-vehicle communication device 23 may communicate with the ground station provided by, for example, the road administrator, to acquire information regarding, for example, a position and an estimated friction coefficient of the low-μ region.

The vehicle-to-vehicle communication device 24 may communicate with a road-to-vehicle communication device provided in a surrounding vehicle, to acquire information regarding, for example, a position and an estimated friction coefficient of the low-μ region the relevant surrounding vehicle passed through.

The rear radar 25 may include millimeter wave radar directed rearward of the own vehicle.

In one embodiment of the technology, the rear radar 25 may serve as a "following vehicle recognition unit".

Moreover, in some cases, other additional sensors directed frontward of the own vehicle may be coupled to the environment recognition unit 20. Non-limiting examples may include millimeter wave radar, and laser scanner device, i.e., LIDAR (light detection and ranging).

The engine control unit 30 may synthetically control an engine and its auxiliaries. The engine may serve as a first power source for vehicle travel.

In the automated driving control of the vehicle, the engine control unit 30 may adjust an output of the engine to match actual output torque of the engine with requested torque instructed by the automated driving control unit 10.

The engine may include, for example, a four-stroke direct injection gasoline engine and other internal combustion engines.

The motor generator control unit 40 may synthetically control a motor generator and its auxiliaries. The motor generator may serve as a second power source for the vehicle travel.

The motor generator may include, for example, a rotary electric machine such as a permanent magnet synchronous motor.

In the automated driving of the vehicle, the motor generator control unit 40 may adjust an output of the motor generator to match actual output torque of the motor generator with the requested torque instructed by the automated driving control unit 10.

Moreover, the motor generator may be used as the regenerative brake to be cooperative controlled with the hydraulic brake, with the use of torque absorption by the regenerative power generation.

At this occasion, the motor generator control unit 40 is configured to control an amount of the regenerative power generation by the motor generator, in accordance with requested braking power to be instructed by the braking controller 12 of the automated driving control unit 10.

The transmission control unit 50 may synthetically control a transmission and its auxiliaries. The transmission may perform shifting of the output of the engine and the output of the motor generator, to transmit the outputs thus shifted, to each wheel.

The transmission control unit 50 may control, for example, a shifting ratio of a shifting mechanism, engagement power of a lock up clutch of a torque converter, and engagement power of an AWD transfer, in accordance with the instructions from the automated driving control unit 10 and in accordance with traveling states of surrounding vehicles. The lock up clutch may be provided at an input port from the engine. The AWD transfer may distribute driving power to front wheels and rear wheels.

The steering control unit 60 may synthetically control an electric steering device and its auxiliaries. The electric steering device may drive a steering gear box by an electric actuator such as a motor. The steering gear box may perform steering of the front wheels of the vehicle.

In the automated driving of the vehicle, the electric steering device may be controlled to match an actual steering angle with a target steering angle to be instructed by the automated driving control unit 10.

The hydraulic control unit 70 may include a fluid pressure generator configured to control, for each wheel, fluid pressure of wheel cylinders of the hydraulic service braking system including, for example, a disc brake.

The hydraulic control unit 70 may include, for example, an electric pump, a pressure booster valve, and a pressure reducing valve. The electric pump may pressurize brake fluids. The pressure booster valve and the pressure reducing valve may adjust the fluid pressure of each of the wheel cylinders.

The hydraulic control unit 70 may control the fluid pressure of the wheel cylinder for each wheel, to generate and change braking power, in accordance with the target braking power to be instructed by the automated driving control unit 10.

Moreover, on the braking occasion, in a case of detection of wheels locking or a symptom of wheels locking, the hydraulic control unit 70 may make the ABS control. The ABS control includes periodically increasing and decreasing the fluid pressure of the wheel cylinder of the relevant wheel, to vary braking power and to restore the revolutions of the relevant wheel.

The braking control device according to the embodiment makes a control as described below, to prevent an intervention by the ABS control on the occasion of passage through the low-$\mu$ region of the road surface during the braking of the vehicle in the automated driving. The low-$\mu$ region has the friction coefficient $\mu$ locally lower than the friction coefficient of the surrounding region of the road surface.

Figure 2:
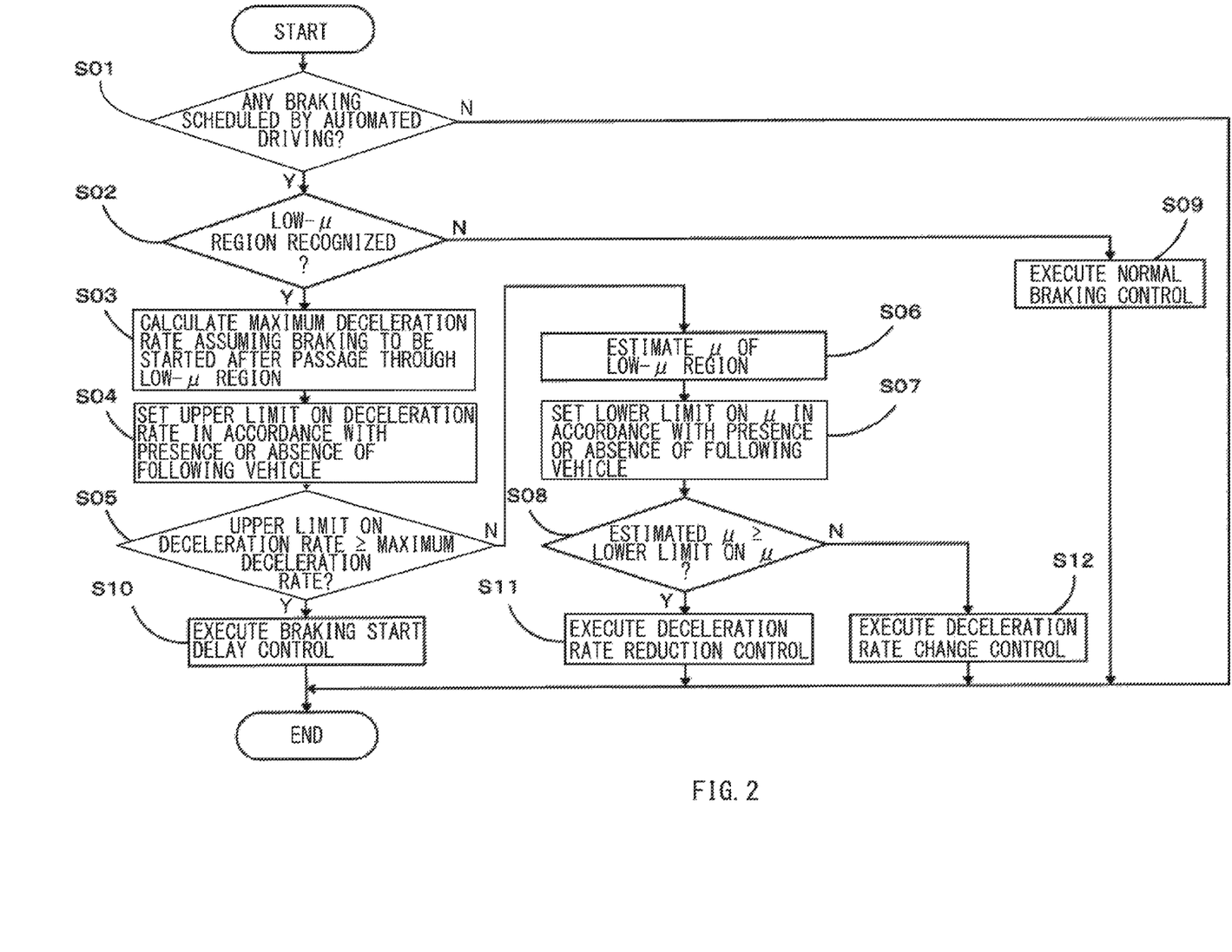
FIG. 2 is a flowchart illustrating operation of the braking control device according to the embodiment.

FIG. 2 is a flowchart illustrating operation of the braking control device according to the embodiment.

In the following, description is given in the order of steps.

<Step S01: Determination as to Braking Scheduled by Automated Driving>

The automated driving control unit 10 may determine whether or not any braking is scheduled in the automated driving scenario generated by the target traveling state generator 11.

For example, the braking may be scheduled in a case with a stop, for example, at a red light and a sign of a temporary stop, or in a case with deceleration at an entrance into a corner or a curved path.

A target position at an end of the braking, and a target vehicle speed at the end of the braking may be set in accordance with the scheduled braking.

For example, in the case with the stop at the red light, the target position at the end of the braking may be a position at which a front end of the vehicle body is directly in front of a stop line, and the target vehicle speed at the end of the braking may be zero, i.e., a stop.

In a case with the braking scheduled by the automated driving (Y in step S01), the flow may proceed to step S02. Otherwise (N in step S01), the series of processing may be terminated and the flow may return.

<Step S02: Determination as to Recognition of Low-$\mu$ Region>

The automated driving control unit 10 may determine whether or not the low-$\mu$ region recognizer 21 of the environment recognition unit 20 has recognized the low-$\mu$ region expected to be passed through by the own vehicle at the braking occasion during execution of the normal braking control.

In a case where the low-$\mu$ region recognizer 21 has recognized the low-$\mu$ region (Y in step S02), the flow may proceed to step S03. Otherwise (N in step S02), the flow may proceed to step S09.

<Step S03: Calculation of Maximum Deceleration Rate Assuming Braking to be Started after Passage Through Low-$\mu$ Region>

The automated driving control unit 10 may calculate a maximum deceleration rate assuming the braking to be started after passage through the low-$\mu$ region to reach the target vehicle speed at the end of the braking at arrival at the target position at the end of the braking.

Thereafter, the flow may proceed to step S04.

<Step S04: Setting of Upper Limit on Deceleration Rate in Accordance with Presence or Absence of Following Vehicle>

The automated driving control unit 10 may set an upper limit on the deceleration rate permissible in a case where a braking start delay control is executed. The braking start delay control includes starting the braking after the passage through the low-$\mu$ region.

The upper limit on the deceleration rate may be set in advance, in consideration of, for example, prevention of abrupt braking of the vehicle from causing instable behavior or giving occupants the feeling of uncomfortableness or anxiety.

Moreover, in a case where the rear radar 25 recognizes a following vehicle, the upper limit on the deceleration rate may be set at a smaller value than without the following vehicle recognized. The following vehicle means a vehicle that follows the own vehicle with a smaller distance than a predetermined value from the own vehicle to the following vehicle.

Thereafter, the flow may proceed to step S05.

<Step S05: Compare Maximum Deceleration Rate to Upper Limit on Deceleration Rate>

The automated driving control unit 10 may compare the maximum deceleration rate obtained in step S03 to the upper limit on the deceleration rate set in step S04.

In a case where the maximum deceleration rate is equal to or lower than the upper limit on the deceleration rate (Y in step S05), the flow may proceed to step S10. Otherwise (N in step S05), the flow may proceed to step S06.

<Step S06: $\mu$ Estimation of Low-$\mu$ Region>

The low-$\mu$ region recognizer 21 of the environment recognition unit 20 may estimate the friction coefficient $\mu$ of the low-$\mu$ region by the method as mentioned above, to obtain the estimated $\mu$.

Thereafter, the flow may proceed to step S07.

<Step S07: Setting of Lower Limit on $\mu$ in Accordance with Presence or Absence of Following Vehicle>

The automated driving control unit 10 may set a lower limit on $\mu$, i.e., a lower limit on the estimated $\mu$ of the low-$\mu$ region, permissible for execution of a deceleration rate reduction control.

The lower limit on $\mu$ may be set in consideration that, for example, in a case where the $\mu$ of the low-$\mu$ region is low, and deceleration in the low-$\mu$ region at the deceleration rate kept low enough to prevent the intervention by the ABS control may result in an excessively long and unpractical braking distance.

In particular, in the case with the presence of the following vehicle, such slow deceleration may give occupants of the following vehicle the feeling of uncomfortableness and anxiety. Thus, the lower limit on $\mu$ may be set at a greater value than in the case with the absence of the following vehicle.

Thereafter, the flow may proceed to step S08.

<Step S08: Compare Estimated $\mu$ to Lower Limit on $\mu$>

The automated driving control unit 10 may compare the estimated $\mu$ obtained in step S06 to the lower limit on $\mu$ set in step S07.

In a case where the estimated $\mu$ is equal to or higher than the lower limit on $\mu$ (Y in step S08), the flow may proceed to step S11. Otherwise (N in step S08), the flow may proceed to step S12.

<Step S09: Execution of Normal Braking Control>

The braking controller 12 of the automated driving control unit 10 may execute the normal braking control.

Details of the normal braking control and other controls described below are given in the following description.

Thereafter, the series of processing may be terminated.

<Step S10: Execution of Braking Start Delay Control>

The braking controller 12 of the automated driving control unit 10 may execute the braking start delay control. The braking start delay control includes delaying a start of braking, as compared to the normal braking control, to start the braking after the passage through the low-μ region.

Thereafter, the series of processing may be terminated.

<Step S11: Execution of Deceleration Rate Reduction Control>

The braking controller 12 of the automated driving control unit 10 may execute the deceleration rate reduction control. The deceleration rate reduction control includes advancing the start of the braking, as compared to the normal braking control, to perform the braking at the deceleration rate lower than the normal braking control, i.e., at the deceleration rate low enough to prevent the intervention by the ABS control in the low-μ region.

Thereafter, the series of processing may be terminated.

<Step S12: Execution of Deceleration Rate Change Control>

The braking controller 12 of the automated driving control unit 10 may execute a deceleration rate change control. The deceleration rate change control includes advancing the start of the braking, as compared to the normal braking control, performing the braking at the deceleration rate high enough to permit the intervention by the ABS control in the low-μ region, making the deceleration rate low enough to prevent the intervention by the ABS control before the passage through the low-μ region, and raising the deceleration rate again after the passage through the low-μ region.

Thereafter, the series of processing may be terminated.

In the following, the braking start delay control, the deceleration rate reduction control, and the deceleration rate change control as mentioned above are described in more detail.

Figure 3:
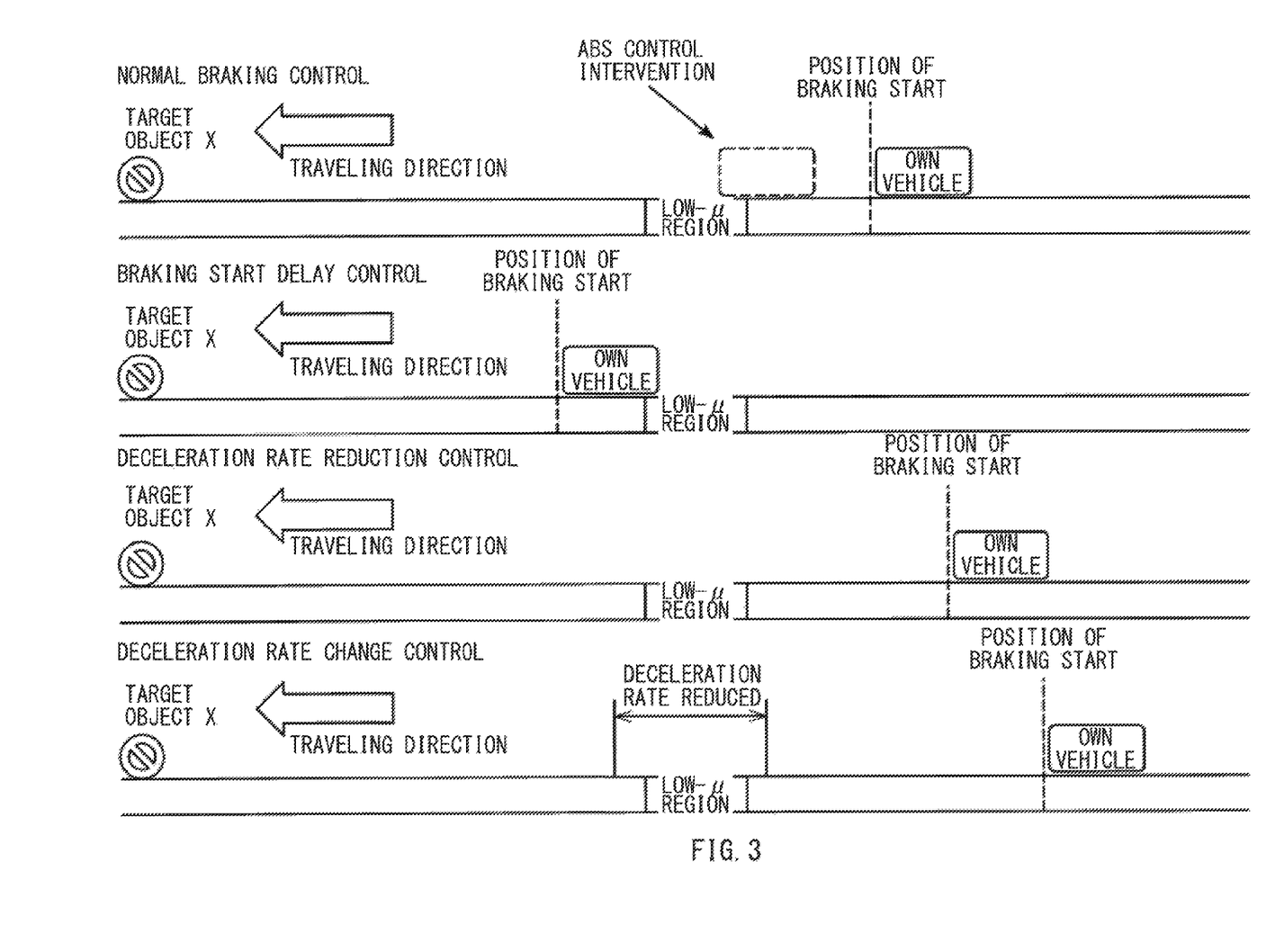
FIG. 3 schematically illustrates positional relation of a low-μ region, a position of a start of braking, and a position of an end of the braking, in each braking control by the braking control device according to the embodiment.

FIG. 3 schematically illustrates positional relation of the low-μ region, a position of the start of the braking, and a position of the end of the braking in each braking control in the braking control device according to the embodiment.

Figure 4:
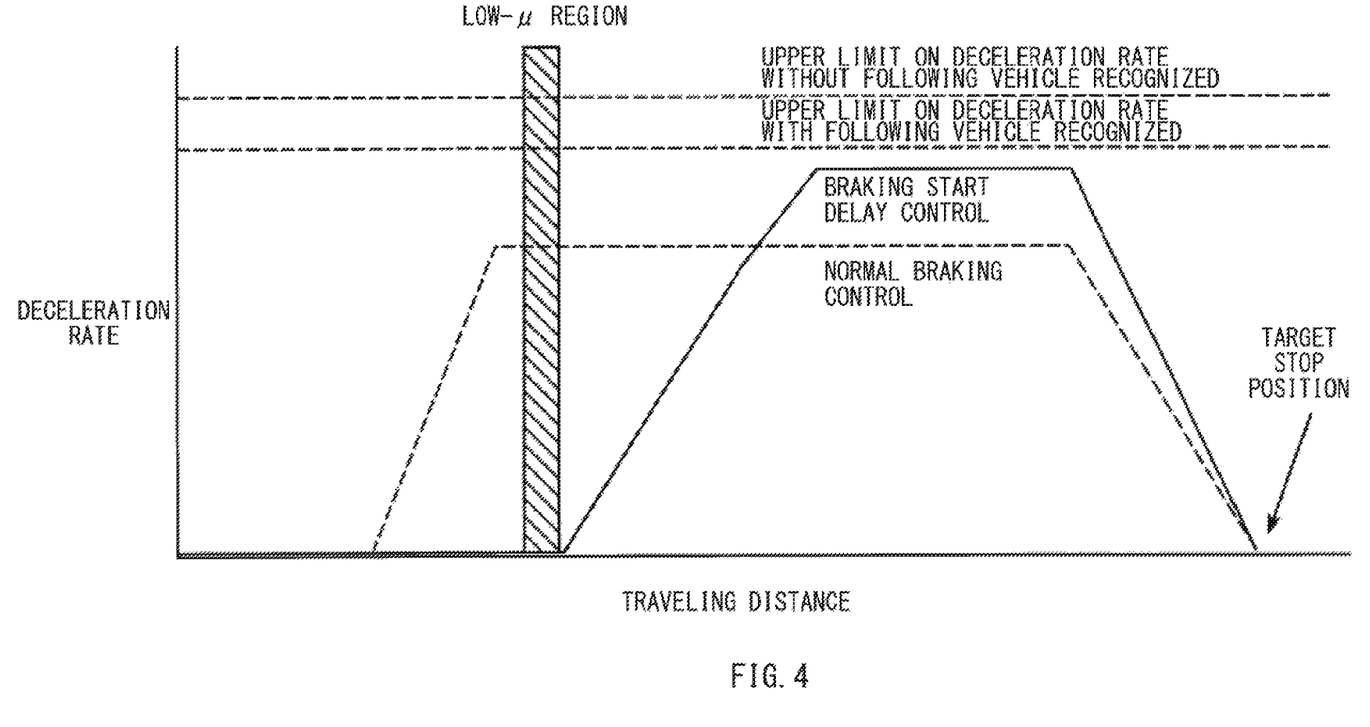
FIG. 4 schematically illustrates transitions of a deceleration rate in accordance with a vehicle traveling distance on the occasion of execution of a braking start delay control by the braking control device according to the embodiment.
Figure 5:
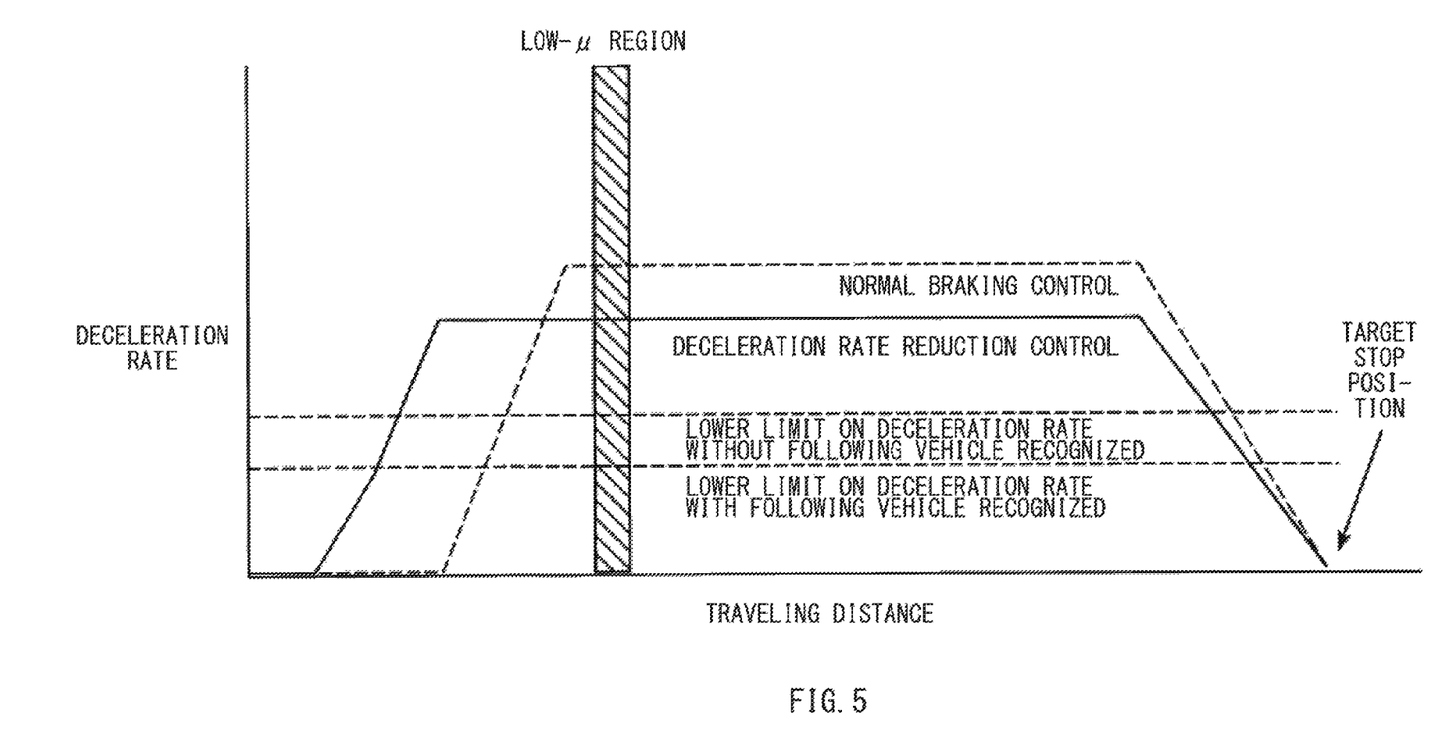
FIG. 5 schematically illustrates transitions of the deceleration rate in accordance with the vehicle traveling distance on the occasion of execution of a deceleration rate reduction control by the braking control device according to the embodiment.
Figure 6:
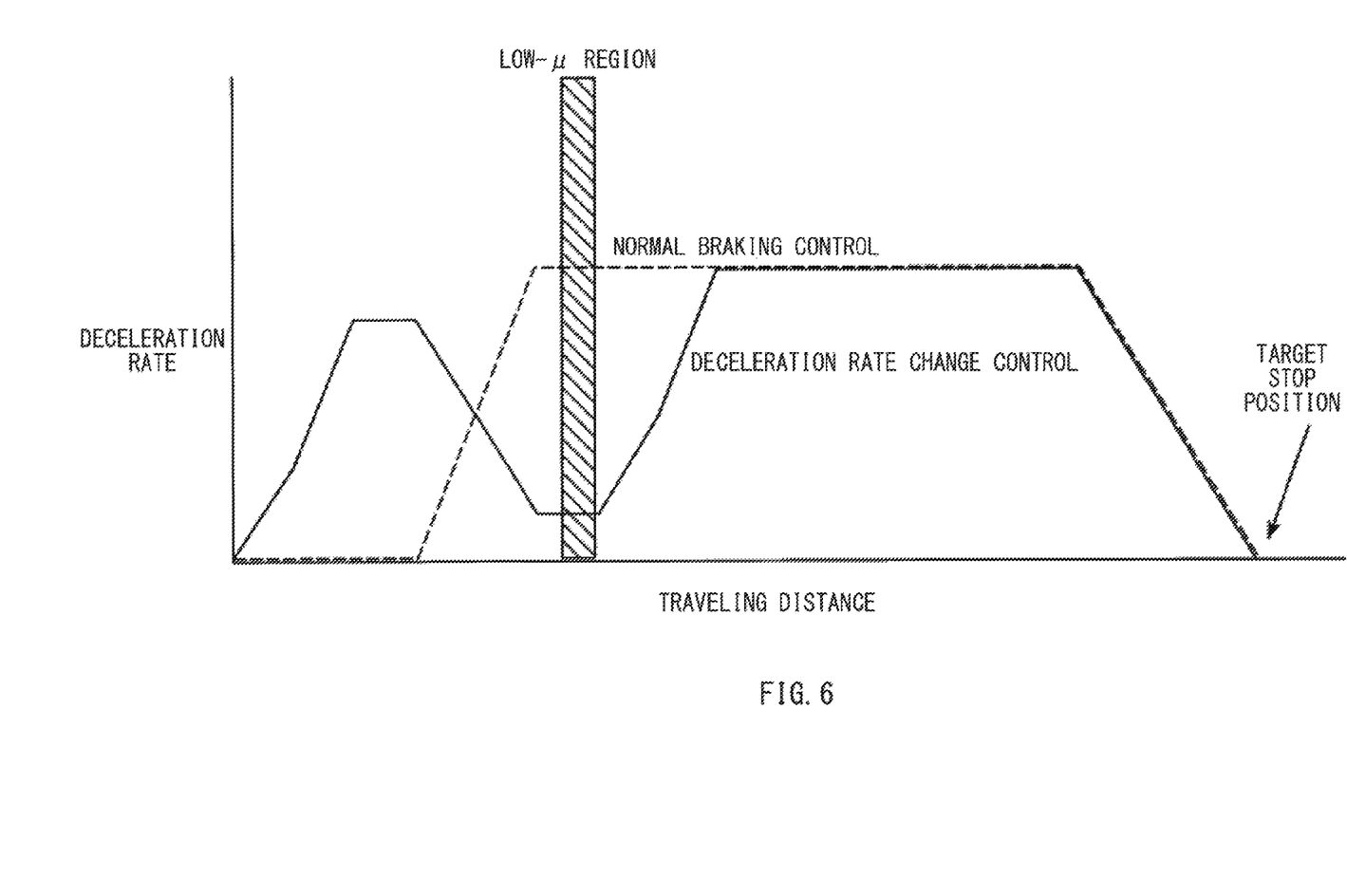
FIG. 6 schematically illustrates transitions of the deceleration rate in accordance with the vehicle traveling distance on the occasion of execution of a deceleration rate change control by the braking control device according to the embodiment.

FIGS. 4, 5, and 6 schematically illustrate transitions of the deceleration rate in accordance with a traveling distance of the vehicle during the execution of the braking start delay control, the deceleration rate reduction control, and the deceleration rate change control, respectively, in the braking control device according to the embodiment.

In FIGS. 4, 5, and 6, horizontal axes denote the traveling distance, while vertical axes denote the deceleration rate, or an acceleration rate in a direction of deceleration, acting on the vehicle body.

In FIGS. 4, 5, and 6, a state in the normal braking control is denoted by broken lines.

The normal braking control is a control to be normally used in a case with no low-μ region recognized. The normal braking control includes controlling braking power to keep the constant target deceleration rate over most of a braking period, and controlling the deceleration rate to increase and decrease substantially linearly over predetermined time, at the start of the braking and at the end of the braking.

The position of the start of the braking may be obtained by calculating from the target position at the end of the braking and the target vehicle speed at the end of the braking, on the basis of the target deceleration rate as mentioned above.

In the case with the passage through the low-μ region during the braking, the intervention by the ABS control may cause abrupt changes in the deceleration rate of the vehicle, or cause driving noises or vibration of equipment accompanying the execution of the ABS control, giving occupants the feeling of uncomfortableness or anxiety.

As illustrated in FIGS. 3 and 4, the braking start delay control includes delaying the position and the timing of the start of the braking, as compared to the normal braking control, to start the braking, or the deceleration, after the passage through the low-μ region. Hence, it is possible to reach the target vehicle speed at the end of the braking at the target position at the end of the braking, at the substantially constant deceleration rate without the intervention by the ABS control. In other words, for example, it is possible to stop the vehicle at a stop position.

During the execution of the braking start delay control, the deceleration rate becomes greater, as compared to the normal braking control. However, setting the upper limit on the deceleration rate to prevent the deceleration rate from becoming greater than the upper limit on the deceleration rate makes it possible to prevent the occupants from having the feeling of anxiety and/or to prevent the instable behavior of the vehicle.

In particular, in the case with the following vehicle recognized, reducing the upper limit on the deceleration rate makes it possible to reduce possible damages by a rear end collision.

In one example, the braking start delay control may include making correction for a lower gradient of an increase in the deceleration rate, in accordance with an increase in the maximum deceleration rate accompanying the delay of the start of the braking. The gradient means an inclination of the graph in, for example, FIG. 4. This makes it possible to prevent the occupants from having the feeling that the deceleration is too abrupt.

As illustrated in FIGS. 3 and 5, the deceleration rate reduction control includes advancing the position and the timing of the start of the braking, as compared to the normal braking control, and reducing the deceleration rate to the value low enough to prevent the intervention by the ABS control in the low-μ region. Hence, it is possible to reach the target vehicle speed at the end of the braking at the target position at the end of the braking, at the substantially constant deceleration rate without the intervention by the ABS control.

Moreover, providing the lower limit on μ makes it possible to prevent such a control from being carried out in the case where the low-μ region includes a road surface having a considerably low μ, e.g., a mirror burn phenomenon. Hence, it is possible to prevent the braking distance from becoming excessively long.

It is to be noted that a lower limit on the deceleration rate in FIG. 5 means a deceleration rate as a threshold at which no intervention is made by the ABS control on an assumption that μ of the road surface in the low-μ region is the lower limit on μ as mentioned above.

In particular, in the case with the following vehicle recognized, raising the lower limit on μ makes it possible to prevent the occupants of the following vehicle from having the feeling of uncomfortableness and anxiety.

As illustrated in FIGS. 3 and 6, the deceleration rate change control includes advancing the position and the timing of the start of the braking, as compared to the normal braking control, reducing the deceleration rate, or braking power, to the value low enough to prevent the intervention by the ABS control in the low-μ region before entrance into the low-μ region, and raising the deceleration rate, or braking power, after the passage through the low-μ region. This makes it possible to prevent the braking distance from becoming excessively long even in the case where μ of the low-μ region is low, and to reach the target vehicle speed at the end of the braking at the target position at the end of the braking without the intervention by the ABS control.

In one alternative, the deceleration rate change control may include reducing the deceleration rate before the passage through the low-μ region, and raising the deceleration rate to a greater value than the deceleration rate before the passage through the low-μ region. For example, as illustrated in FIG. 6, the deceleration rate after the passage through the low-μ region may be set to an equivalent value to the maximum deceleration rate of the normal braking control.

In this case, it is possible to prevent the braking distance from being longer because of the temporary reduction in the deceleration rate.

In vehicles that make the cooperative control of the regenerative brake by the motor generator and the hydraulic brake, the ABS control is normally performed using the hydraulic brake. This is because the hydraulic brake makes it easier to control braking power for each wheel, separately and with high responsiveness.

In this embodiment, it is possible to prevent the intervention by the ABS control, making it possible to perform the braking with the regenerative brake over a more expansive range. It is therefore possible to increase an amount of power generation, i.e., an amount of energy regeneration, leading to improved energy efficiency of the vehicle.

(Modification Examples)

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

(1) The configurations of the braking control device, the automated driving control apparatus, and the vehicle are not limited to those described in the forgoing embodiments but may be changed as appropriate.

For example, in the forgoing embodiments, the vehicle is an engine-electric hybrid vehicle, but this is non-limiting. The embodiments of the technology are also applicable to vehicles including an engine as their travel power source or vehicles including an electric motor as their travel power source.

(2) In the forgoing embodiments, techniques as to how to recognize the low-μ region and how to estimate the friction coefficient of the low-μ region are given as examples and may be changed as appropriate.

(3) In the forgoing embodiments, for example, the braking control device constitutes part of the automated driving control apparatus and carries out the braking by the automated driving control. However, the embodiments of the technology are not limited to the automated driving but are applicable to driver assistance apparatuses that carry out, for example, an adaptive cruise control. The adaptive cruise control includes, for example, making a vehicle speed control to follow a preceding vehicle.

(4) In the forgoing embodiments, the braking start delay control, the deceleration rate reduction control, and the deceleration rate change control are carried out by the same braking control device. In one alternative, the braking control device may perform the braking start delay control, the deceleration rate reduction control, or the deceleration rate change control, or any combination thereof.

According to the embodiments of the technology, the braking power control unit is configured to estimate the maximum deceleration rate assuming the braking to be started after the passage through the low friction coefficient region to cause the deceleration to the target vehicle speed at the target position. In the case where the maximum deceleration rate is smaller than the predetermined upper limit on the deceleration rate, the braking power control unit is configured to cause the start of the generation of braking power after the passage through the low friction coefficient region.

Causing the start of the generation of braking power after the passage through the low friction coefficient region makes it possible to prevent wheels locking during the passage through the low friction coefficient region in a braking state, leading to prevention of the intervention by the ABS control. Hence, it is possible to prevent the occupants from having the feeling of uncomfortableness, and to prevent operation noises or vibration of equipment by the ABS control.

Moreover, making such a control in the case where the maximum deceleration rate is smaller than the predetermined upper limit on the deceleration rate makes it possible to prevent abrupt deceleration and to prevent the occupants from having the feeling of anxiety.

According to the embodiments of the technology, in the case with the following vehicle recognized, the braking power control unit may reduce the upper limit on the deceleration rate to the smaller value than without the following vehicle recognized.

Placing limitation on the deceleration rate in the case with the following vehicle recognized makes it possible to prevent the occupants of the following vehicle from having the feeling of uncomfortableness or anxiety. It is also possible to prevent possible damages by a collision with the following vehicle from behind.

According to the embodiments of the technology, in the case where the maximum deceleration rate is greater than the upper limit on the deceleration rate, the braking power control unit may cause the start of the generation of braking power in front of the low friction coefficient region, change the position of the start of the generation of braking power, in a direction more away from the target position than without the low friction coefficient region recognized, and reduce the maximum deceleration rate to the smaller value than without the low friction coefficient region recognized.

Thus, in the case where the start of the braking after the passage through the low friction coefficient region causes the abrupt deceleration, making slow deceleration in front of the low friction coefficient region makes it possible to decelerate appropriately, and to prevent an intervention by the ABS control.

According to the embodiments of the technology, in the case with the low friction coefficient region recognized, the braking power control unit is configured to change the position of the start of the generation of braking power, in front of the low friction coefficient region, in the direction more away from the target position than without the low friction coefficient region recognized, and reduce the maximum deceleration rate during the deceleration, to the smaller value than without the low friction coefficient region recognized.

Making the slow deceleration in front of the low friction coefficient region, in accordance with the recognition of the low friction coefficient region expected to be passed through during the braking, makes it possible to decelerate appropriately, while preventing the intervention by the ABS control in the low friction coefficient region.

According to the embodiment of the technology, in the case where the estimated friction coefficient is smaller than the predetermined lower limit on the friction coefficient, the braking power control unit may reduce the deceleration rate after the start of the generation of braking power and before the passage through the low friction coefficient region, and raise the deceleration rate after the passage through the low friction coefficient region.

In the case where the friction coefficient in the low friction coefficient region is considerably low, decelerating at the constant deceleration rate low enough to prevent the intervention by the ABS control in the low friction coefficient region results in the excessively long braking distance. In such a case, reducing the deceleration rate before the passage through the low friction coefficient region, and raising the deceleration rate after the passage through the low friction coefficient region make it possible to prevent the intervention by the ABS control and to provide the sufficient braking distance.

According to the embodiments of the technology, in the case with the following vehicle recognized, the braking power control unit may raise the lower limit on the friction coefficient to the greater value than without the following vehicle recognized.

This makes it possible to perform the slow braking, with the presence of the following vehicle. Hence, it is possible to prevent occupants of the following vehicle from having the feeling of uncomfortableness.

According to the embodiments of the technology, in the case with the low friction coefficient region recognized, the braking power control unit is configured to reduce the deceleration rate before the passage through the low friction coefficient region, and raise the deceleration rate after the passage through the low friction coefficient region.

Thus, reducing the deceleration rate before the passage through the low friction coefficient region during the braking, and raising the deceleration rate after the passage through the low friction coefficient region make it possible to prevent the intervention by the ABS control and to provide the sufficient braking distance.

As described, according to the embodiments of the technology, it is possible to provide the braking control device that makes it possible to decelerate appropriately even in the case where the friction coefficient of the road surface is locally low, while preventing the intervention by the ABS control.

The automated driving control apparatus 1 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the automated driving control apparatus 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the automated driving control apparatus 1 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A braking control device, comprising:
a target vehicle speed setting unit configured to set a target position ahead of an own vehicle, and set a target vehicle speed at arrival of the own vehicle at the target position;
a braking power control unit configured to make a braking power control of a braking device, to bring a vehicle speed of the own vehicle to the target vehicle speed at the arrival of the own vehicle at the target position; and
a low friction coefficient region recognition unit configured to recognize a low friction coefficient region of a road surface between a current position of the own vehicle and the target position, the low friction coefficient region having a friction coefficient locally lower than a friction coefficient of a surrounding region of the road surface, wherein
the braking power control unit is configured to estimate a maximum deceleration rate assuming braking to be started after passage through the low friction coefficient region to cause deceleration to the target vehicle speed at the target position, and
on a condition that the maximum deceleration rate is smaller than a predetermined upper limit on a deceleration rate, the braking power control unit is configured to cause a start of generation of braking power after the passage through the low friction coefficient region.

2. The braking control device according to claim 1, further comprising a following vehicle recognition unit configured to recognize a following vehicle, wherein
on a condition that the following vehicle recognition unit recognizes a following vehicle, the braking power control unit is configured to reduce the upper limit on the deceleration rate to a smaller value than without the following vehicle recognized.

3. The braking control device according to claim 1, wherein
on a condition that the maximum deceleration rate is greater than the upper limit on the deceleration rate, the braking power control unit is configured to
cause the start of the generation of braking power in front of the low friction coefficient region,
change a position of the start of the generation of braking power, in a direction more away from the target position than without the low friction coefficient region recognized, and
reduce the maximum deceleration rate during the deceleration, to a smaller value than without the low friction coefficient region recognized.

4. The braking control device according to claim 2, wherein
on a condition that the maximum deceleration rate is greater than the upper limit on the deceleration rate, the braking power control unit is configured to cause the start of the generation of braking power in front of the low friction coefficient region,
change a position of the start of the generation of braking power, in a direction more away from the target position than without the low friction coefficient region recognized, and
reduce the maximum deceleration rate during the deceleration, to a smaller value than without the low friction coefficient region recognized.

5. A braking control device, comprising:
a target vehicle speed setting unit configured to set a target position ahead of an own vehicle, and set a target vehicle speed at arrival of the own vehicle at the target position;
a braking power control unit configured to make a braking power control of a braking device, to bring a vehicle speed of the own vehicle to the target vehicle speed at the arrival of the own vehicle at the target position; and
a low friction coefficient region recognition unit configured to recognize a low friction coefficient region of a road surface, the low friction coefficient region being expected to be passed through by the own vehicle during the braking power control, and having a friction coefficient locally lower than a friction coefficient of a surrounding region of the road surface, wherein
on a condition that the low friction coefficient region recognition unit recognizes the low friction coefficient region, the braking power control unit is configured to
change a position of a start of generation of braking power, in front of the low friction coefficient region, in a direction more away from the target position than without the low friction coefficient region recognized, and
reduce a maximum deceleration rate during deceleration, to a smaller value than without the low friction coefficient region recognized.

6. The braking control device according to claim 3, wherein
the low friction coefficient region recognition unit is configured to obtain an estimated friction coefficient of the low friction coefficient region, and
on a condition that the estimated friction coefficient is smaller than a predetermined lower limit on the friction coefficient, the braking power control unit is configured to
reduce the deceleration rate after the start of the generation of braking power and before the passage through the low friction coefficient region, and
raise the deceleration rate after the passage through the low friction coefficient region.

7. The braking control device according to claim 4, wherein
the low friction coefficient region recognition unit is configured to obtain an estimated friction coefficient of the low friction coefficient region, and
on a condition that the estimated friction coefficient is smaller than a predetermined lower limit on the friction coefficient, the braking power control unit is configured to
reduce the deceleration rate after the start of the generation of braking power and before the passage through the low friction coefficient region, and
raise the deceleration rate after the passage through the low friction coefficient region.

8. The braking control device according to claim 5, wherein
the low friction coefficient region recognition unit is configured to obtain an estimated friction coefficient of the low friction coefficient region, and
on a condition that the estimated friction coefficient is smaller than a predetermined lower limit on the friction coefficient, the braking power control unit is configured to
reduce the deceleration rate after the start of the generation of braking power and before the passage through the low friction coefficient region, and
raise the deceleration rate after the passage through the low friction coefficient region.

9. The braking control device according to claim 6, further comprising a following vehicle recognition unit configured to recognize a following vehicle, wherein
on a condition that the following vehicle recognition unit recognizes a following vehicle, the braking power control unit is configured to raise the lower limit on the friction coefficient to a greater value than without the following vehicle recognized.

10. The braking control device according to claim 7, further comprising a following vehicle recognition unit configured to recognize a following vehicle, wherein
on a condition that the following vehicle recognition unit recognizes a following vehicle, the braking power control unit is configured to raise the lower limit on the friction coefficient to a greater value than without the following vehicle recognized.

11. The braking control device according to claim 8, further comprising a following vehicle recognition unit configured to recognize a following vehicle, wherein
on a condition that the following vehicle recognition unit recognizes a following vehicle, the braking power control unit is configured to raise the lower limit on the friction coefficient to a greater value than without the following vehicle recognized.

12. A braking control device, comprising:
a target vehicle speed setting unit configured to set a target position ahead of an own vehicle, and set a target vehicle speed at arrival of the own vehicle at the target position;
a braking power control unit configured to make a braking power control of a braking device, to bring a vehicle speed of the own vehicle to the target vehicle speed at the arrival of the own vehicle at the target position; and
a low friction coefficient region recognition unit configured to recognize a low friction coefficient region of a road surface, the low friction coefficient region being expected to be passed through by the own vehicle during the braking power control, and having a friction coefficient locally lower than a friction coefficient of a surrounding region of the road surface, wherein
on a condition that the low friction coefficient region recognition unit recognizes the low friction coefficient region, the braking power control unit is configured to
reduce a deceleration rate before passage through the low friction coefficient region, and
raise the deceleration rate after the passage through the low friction coefficient region.

* * * * *